(12) United States Patent
Meir

(10) Patent No.: US 6,567,262 B2
(45) Date of Patent: May 20, 2003

(54) LIQUID COOLED TEC BASED SYSTEM AND METHOD FOR COOLING HEAT SENSITIVE ELEMENTS

(75) Inventor: Ronen Meir, Ashkelon (IL)

(73) Assignee: Active Cool Ltd., Ashkelon (IL)

( * ) Notice: Subject to any disclaimer, the term of this patent is extended or adjusted under 35 U.S.C. 154(b) by 41 days.

(21) Appl. No.: 09/870,774

(22) Filed: Jun. 1, 2001

(65) Prior Publication Data

US 2002/0191430 A1 Dec. 19, 2002

(51) Int. Cl.[7] ................................................ H02B 1/00
(52) U.S. Cl. ....................................................... 361/676
(58) Field of Search ................................ 361/103, 601, 361/676, 688, 689, 698

(56) References Cited

U.S. PATENT DOCUMENTS 5,561,981 A * 10/1996 Quisenberry et al.
5,794,450 A *  8/1998 Alexander

* cited by examiner

Primary Examiner—Edward H. Tso
(74) Attorney, Agent, or Firm—Dennison, Schultz & Dougherty

(57) ABSTRACT

A cooling system and method for cooling a heat sensitive element in an enclosure, such as a CPU, the cooling system including a high power active cooling unit having at least one Thermo Electric Cooler (TEC) component having a cooling liquid circuit passing through a cold side heat sink therein, the cooling liquid circuit being coupled to a heat sink coupled to the heat sensitive element and having a cooling liquid circuit therethrough; a dedicated power supply; and a controller for controlling the TEC components and the cooling liquid pump.

25 Claims, 6 Drawing Sheets

LIQUID COOLED TEC BASED SYSTEM AND METHOD FOR COOLING HEAT SENSITIVE ELEMENTS

FIELD OF THE INVENTION

The present invention relates to a system and method for active cooling of a computer microprocessor (CPU) to reduce the heat problems.

BACKGROUND OF THE INVENTION

Processor power, and therefore speed, is increasing rapidly. From the beginning of personal computers and until now, the trend of increasing temperature in CPUs is clear.

The first processor models, such as XT, 286, 386 did not require any thermal solutions. Their power consumption and, therefore, temperature was low. When the 486 came out, it needed a small heat sink (an aluminum plate attached to the CPU) to decrease and remove the heat. The heat is increased due to the increasing number of transistors, also called CMOS devices, located on the silicon wafer, and increasing switching speed. Each CPU model has several versions of switching speed, and the switching speed and temperature are correlated.

The Pentium CPU needs a heat sink and a fan. Thus, a whole new market of passive cooling solutions emerged. Pentium II models came out with a different structure, with increasing power and heat. This CPU, and others such as the AMD Athlon or Thunderbird CPU model, for example, needed a very large heat sink and fan, and sometimes two fans or more (Pentium 4). The trend of rising heat continued.

The heat of a CPU reduces its reliability, and therefore the reliability of the entire computer system, and affects the switching speed. Therefore, it is crucial for the efficient performance and operation of the computer system to reduce the heat of the CPU.

As more and more transistors are placed on a small silicon wafer, and switching speed increases, the chip temperature increases on the silicon chip, creating a very small area of high heat that must be removed quickly and efficiently. While chip manufacturers are interested in keeping chip size small, so as to make more chips from a single silicon wafer, keeping the chip size small while increasing power, speed and number of transistors is problematic. Furthermore, the chip sensitivity increases as the size of transistors inside the chip decreases and the number of transistors increases. Thus, a rapid change in temperature, such as when turning the computer on or off, can lead to a short life, errors, and total failure of the chip.

Passive solutions cannot pump heat in an efficient way from a small spot producing a great deal of heat (the efficiency above 50 W decreases fast), although some efforts were made in the direction of using other materials, such as copper heat sinks and better attachment material between the silicon chip and the heat sink (such as phase change interface pad from Chomerics (Parker Hannifin Corp, 77 Dragon Court, Woburn, Mass. 01888-4014, U.S.A) that reduces the thermal resistance, or Arctic cool by Agilent (Palo Alto, Calif., U.S.A.). These improvements are all passive, and not able sufficiently to reduce, heat pump, and control the temperature, as can an active cooling system.

It will be appreciated that the important parameters are the amount of heat pumped (in Watts), and the temperature decrease (delta T in degrees Celsius). Both of these parameters are important, as each CPU has an absolute maximum temperature defined by the manufacturer (maximum T case). For example, Pentium 4 run at 1.5 GHz, maximum temperature of 72° C. (See "Intel thermal specification", section 6.1, from Intel Pentium 4 data sheet). The heat pump, defined in watts, must, therefore, pump sufficient heat to maintain the CPU inside the permitted range, with an acceptable safety margin.

Some passive coolers are better then others and while they can improve heat pump power, the temperature often rises to dangerous level.

Another way to solve this problem is to increase the chip size. However, from a business point of view, in doing so as, from a single silicon wafer, they will be able to produce fewer chips, which means increased cost and creating a manufacturing capacity problem.

A further problem of high speed CPU's is that, when the computer is turned off or in the case of a power cut, fast changing temperature over a short period of time often results in thermal shock, which could change characteristics of the CPU and reduce reliability. Another problem which arises when switching the unit off is that the fast rise in temperature can cause cooling liquid condensation in the unit's cold side, which can lead to serious problems.

The conventional cooling systems described above are all passive systems. This means that they remove heat from the CPU of the computer system by means of passive components, such as fans and heat sinks, but do not actively input cold by pumping the heat with active components, to accelerate heat pumping, delta T, and efficiency. The passive solutions cannot control the temperature, as they are passive and do not utilize electronic control. In addition, the reaction time and heat pumping over time is very low, compared to active cooling. For example, low reaction time when turning on the computer can cause a fast change in temperature inside the chip over a very short period of time, causing thermal shock to the chip that can cause damage.

At present, passive cooling solutions are close to their limit. A new solution and approach are needed. Active cooling can pump out a high power of heat and reduce chip temperature. Decreasing the CPU temperature will allow increasing the switching speed. These phenomena are known as thermal acceleration.

A computer including an active cooling system has been proposed by KryoTech, Inc., of West Colombia, S.C., USA. This computer utilizes a vapor phase cooling method, and includes a compressor and condenser with gas and moving mechanical parts mounted inside a special, custom-made PC case. KryoTech markets an accelerated speed computer, and does not provide a generic solution.

Also Kryotech requires a special turn-off procedure to avoid thermal shock and condensation. This procedure must be followed by a human user, which can lead to mistakes and damage. Furthermore, when using the Kryotech system, the user must use an expensive UPS (Uninterruptible Power Supply).

Thermo Electric Cooler (TEC) components, components based on the Paltier effect, are well known in the relevant industry. When electrical DC power is supplied to the TEC component, one side of the component becomes very cold and the other side very hot (partly because of heat pulled from the CPU itself, and partly due to the low efficiency of the TEC component which generates additional heat). In operation, the component actually pumps heat from the cold side to the hot side. The Thermo Electric Cooling component has a low efficiency, and demands high power for operation, which is one of the reasons TEC's were generally not considered to be useful for cooling CPU's and other heat producing components. There are many models of thermo electric coolers, each with different characteristics and requiring a different power input. For an advanced CPU, a high power thermo electric component is needed.

In addition to the problems discussed above regarding passive cooling systems, one problem encountered in cooling computer CPU's by means of a TEC module is that the heat built up on the hot side of a thermoelectric module used for cooling must be removed from the PC box. (When applying cooling to the CPU, the hot side of the thermoelectric component is much hotter because of its low efficiency, around 30 percent).

The present invention, described below, is a complete system that solves all the problems mentioned above. In particular, it is a generic device, which can be mounted in any PC. As the system of the current invention is active, both the amount of heat pumped, and the temperature decrease can be achieved with significant improvement, as compared with conventional cooling systems.

SUMMARY OF THE INVENTION

There is provided, in accordance with the present invention, a cooling system for a heat sensitive element in an enclosure, such as a CPU, the cooling system including a high power active cooling unit having at least one Thermo Electric Cooler (TEC) component having a cooling liquid circuit passing through a cold side heat sink therein, the cooling liquid circuit being coupled to a heat sink coupled to the heat sensitive element and having a cooling liquid circuit therethrough; a dedicated power supply; and a controller for controlling the TEC components and the cooling liquid pump.

Preferably, the cooling liquid circuit includes water or a cooling liquid. According to one embodiment, the cooling liquid includes water mixed with ethyl glycol, to prevent corrosion when aluminum or copper parts are used in the system.

According to a preferred embodiment, the cooling system includes a plurality of TEC components, a single cooling liquid circuit passing through all the TEC components, and a cooling liquid pump According to a preferred embodiment of the invention, the system of the present invention is configured as a PC enclosure cover. This embodiment will allow the use of active cooling for any PC or computer merely by making small changes in the pc/computer cover only.

There is also provided, accordance with the present invention, a method of cooling a heat sensitive element, such as a CPU, mounted in an enclosure, the method including coupling a high power active cooling unit energized by a dedicated power supply having at least one Thermo Electric Cooler (TEC) component to the enclosure, the TEC component having a cooling liquid circuit passing through a cold side heat sink therein; and coupling the cooling liquid circuit to a cooling liquid circuit in a heat sink coupled to the heat sensitive element.

According to a preferred embodiment, the high power active cooling unit includes a plurality of TEC components, a single cooling liquid circuit passing through all the TEC components, and a cooling liquid pump.

BRIEF DESCRIPTION OF THE DRAWINGS

The present invention will be further understood and appreciated from the following detailed description taken in conjunction with the drawings in which.

DETAILED DESCRIPTION OF THE INVENTION

Figure 1:
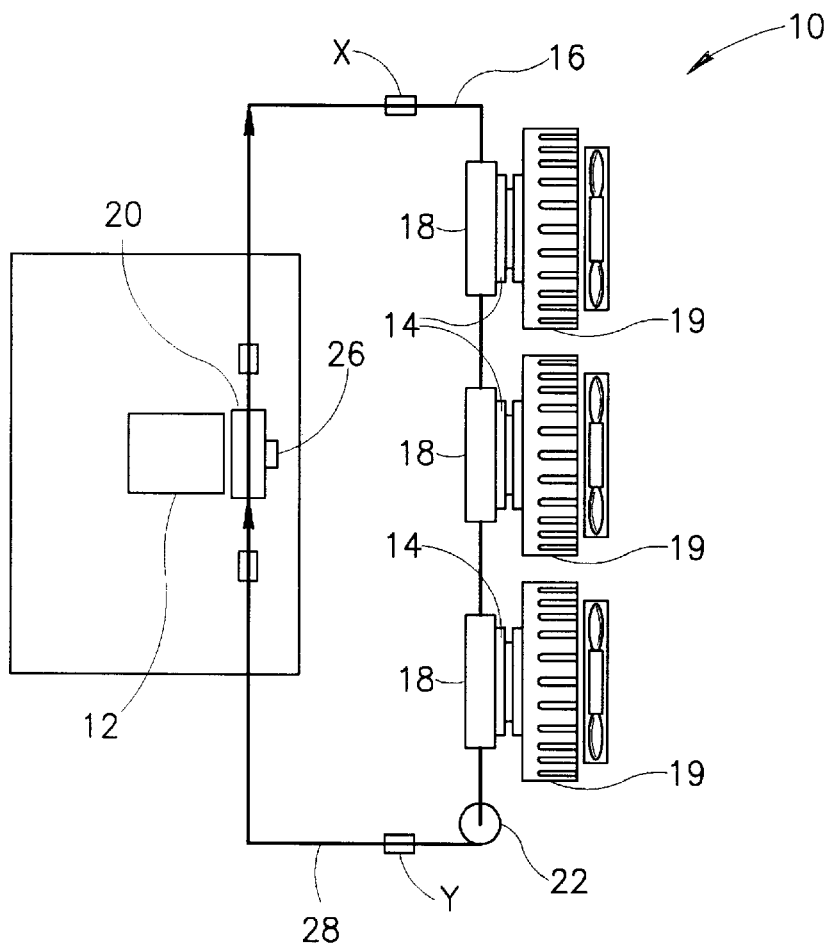
FIG. 1 is a schematic illustration of an active cooling system for a computer CPU constructed and operative in accordance with one embodiment of the present invention.

The invention described herein is a high power active cooling system for a heat sensitive element, most particularly a CPU or semiconductor, enabling one to solve the heat problem and add the benefit of thermal acceleration of the CPU. As used in the present application, high power means that 100 to 500 Watts, and more, can be removed from the CPU. The system preferably includes several Thermo Electric Cooler (TEC) components. The TEC component cold side is attached to aluminum or copper plates, includes a cooling liquid circuit passing therethrough. The cooling liquid circuit can be formed of aluminum or copper tubes formed in the plates. A small heat sink, having its own cooling liquid passage, is attached to the CPU surface. The TEC component cold side is coupled, as by flexible, insulated tygon tubes, or other suitable tubing, to the CPU heat sink, for providing cooling directly to the CPU. In this way, the CPU small heat sink is in contact with a constant flow of cooled cooling liquid, that draws off the heat generated by the CPU.

Preferably, the cooling liquid circuit includes a single cooling liquid circuit passing through all the TEC components, and and a cooling liquid pump. It may also include an expansion or storage tank to accommodate thermal expansion of the liquid as the temperature increases. For example, a plastic storage tank can be provided which is about half full of cooling liquid at room temperature.

A cooling liquid, which can be water, or other liquid, such as FC75 (made by 3M Company, USA), Coolanol 25, Coolanol 45 (manufactured and sold by Monsanto Chemical Company, USA), is applied, by a cooling liquid pump, to the cooled heat sinks, and cooled to low temperatures. The cooled cooling liquid then is carried to the small heat sink on the CPU. The cooling liquid can include water mixed with ethyl glycol, to prevent corrosion when aluminum or copper parts are used in the system.

According to a preferred embodiment, the system of this invention can be in a configuration of a PC cover, all the system elements and sub systems, such as independent high efficiency low profile power supply, dedicated microprocessor for control of temperature, anti thermal shock back up system, batteries, charger, sensors, being located in a new PC cover that will replace the original PC cover.

It will be appreciated that, while the invention has been described with reference to a CPU, the cooling system can alternatively be used to cool a semiconductor or other heat sensitive components in an enclosure, such as graphic card chip, chipset, hard drive. Alternatively, the system can be utilized to cool both a CPU and a low power heat sensitive element in the same enclosure. This can be accomplished by coupling the low power heat sensitive element to a heat sink with cooling liquid passages running in series with the CPU cooling liquid passages, or in a separate low power loop. In this case, another liquid circulation loop is provided, and a tube for cooling liquid is passed to it. Another pump is added for the cooled liquid, and auxiliary cooling can be provided to other elements in the enclosure. A completely separate loop with a TEC element and a fan can be added to support a high power auxiliary chip.

The cooled heat sinks with the TEC elements can vary in number, so different models with different power can be made, for example with 2 TEC components, about 70 W to W can be pumped, with 3 TEC components, about 100 W to 250 W can be pumped. (The power varies, as it depends on TEC selection, the power supplied to the TEC, and selected target temperature).

More units can be added to increase the power of the system or to decrease the temperature with the same power. Decreasing the temperature will allow thermal acceleration of CPU speed.

Referring now to FIG. 1, there is shown a schematic illustration of an active cooling system 10 for a computer CPU 12, or other heat sensitive element, constructed and operative in accordance with one embodiment of the present invention. Active cooling system 10 includes a plurality of TEC (Thermo Electric Cooling) components 14 coupled to one another in series. The cooling system can include a single TEC component, or a larger number of TEC components, depending upon the quantity of heat per unit time which must be removed from the CPU 12.

TEC component 14 can be a conventional TEC (for example, a 70 W TEC, 40×40 mm area), such as DT12-6 manufactured by Marlow Industries, Inc., or CP1.4-127-06L manufactured by Melcor, US. Alternatively, the TEC component used can be a future advanced TEC, such as bismuth telluride with cesium (having increased ΔT and efficiency). These future TECs will also be able to lower temperature to below zero degrees Celsius (by adding anti-freeze liquid to the cooling liquid), and to work with better efficiency in the normal temperature range, as per CPU specifications (usually CPU about 5 to 70 degrees C.)

TEC component 14 is coupled via a thermally conductive material or compound to a cold side heat sink 18 and a hot side heat sink 19. Cold side heat sink 18, here illustrated as an aluminum or copper adapter/extender, can have any desired shape permitting passage therethrough of cooling liquid pipes, as described below. The adapter also extends the distance from the hot side heat sink (not shown on drawing), allowing insertion of thermal insulation material (not shown).

The TEC elements cool the cold side heat sink by pumping heat away to the hot side. The hot side heat sink of the TEC is attached to fans which take the heat away to the outside of the enclosure and/or PC, as through slots in the cover, as described below. It will be appreciated that the fans continue to operate for a few minutes after the computer has been shut down, in order to cool the hot side heat sinks.

Figure 2:
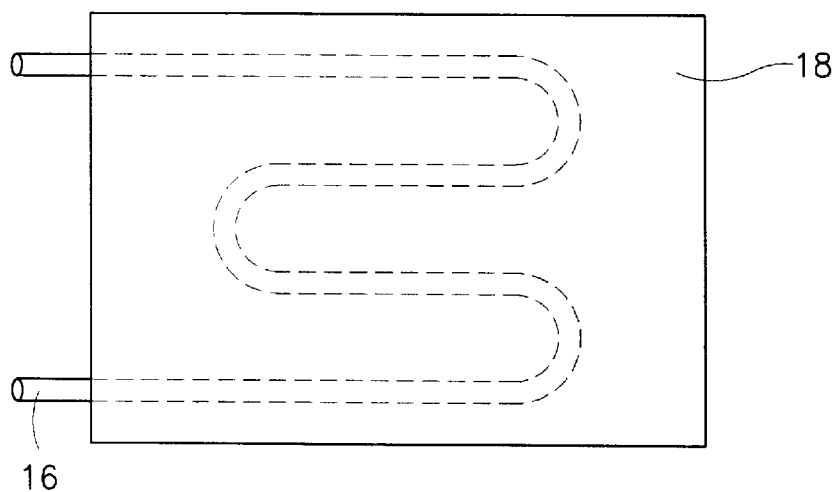
FIG. 2 is a plan view of a TEC cold side plate component in the active cooling system of FIG. 1.

A cooling liquid circuit 16 passes through the cold side heat exchangers (heat sinks) 18 of each of the TEC components 14, preferably formed of copper tubing, as shown schematically in FIG. 2. The heat sink 18 cools the inserted pipes 16 made from copper or aluminum, so the liquid flowing inside the pipes is cooled. The cooling liquid circuit also passes through the small heat sink 20, preferably formed of aluminum or copper, located on the CPU 12 to be cooled. Heat sink 20 is attached to the target CPU 12 using a thermally conductive material, such as silicon paste. This heat sink has many cooling liquid passages dispersed throughout its surface area, that combine into one inlet and one outlet, so the cooled cooling liquid passes therethrough and draws the heat away from the CPU, providing cooling.

Figure 7:
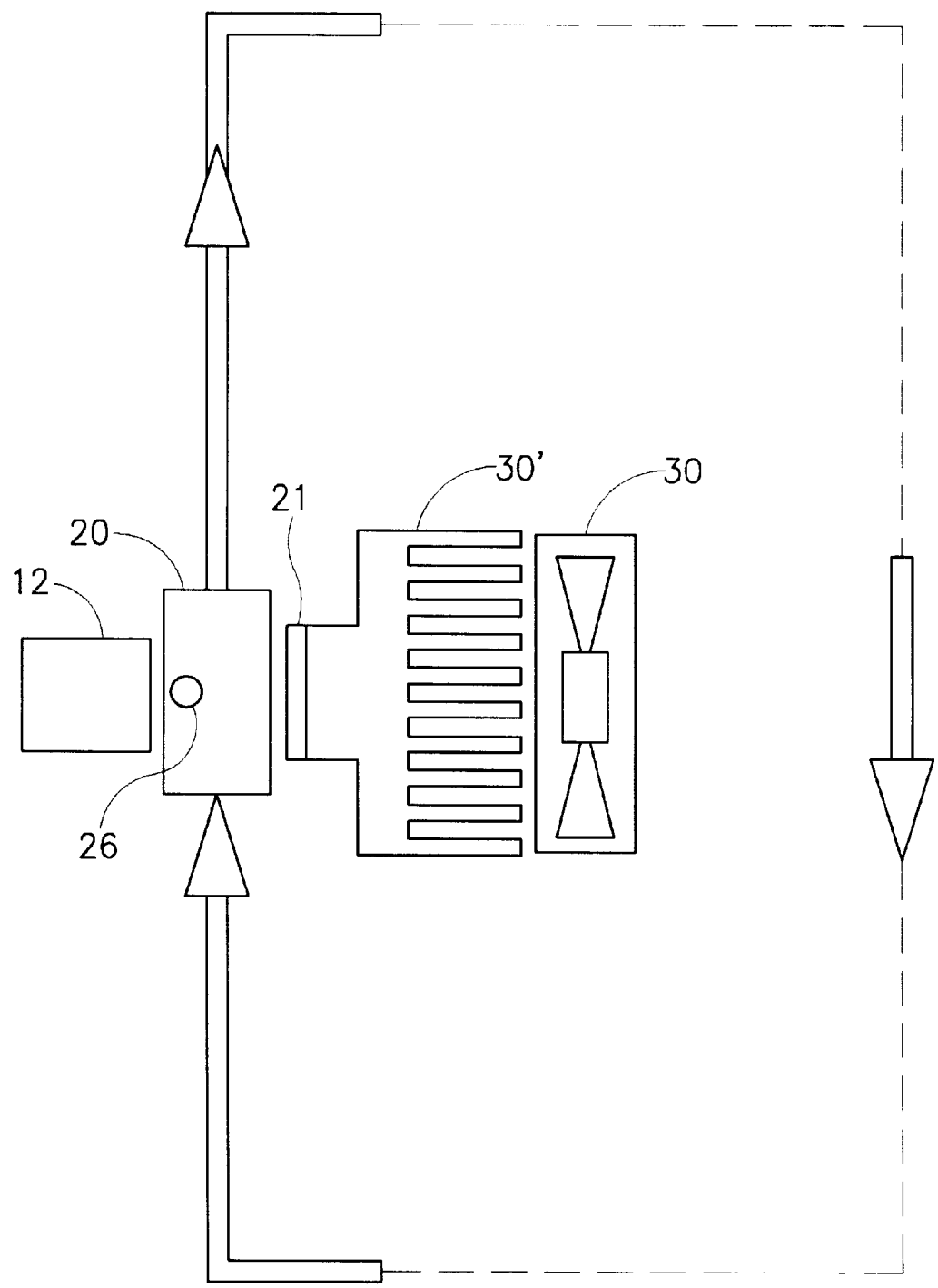
FIG. 7 is a schematic illustration of an alternative embodiment of the invention.

For extra cooling, a small power TEC 21 cold side can be attached directly to the heat sink 20 on the CPU 12, to further improve cooling, as shown in FIG. 7. Power is delivered to TEC 21 by the dedicated power supply (SMPS 36) in the cooling system. Small TEC 21 has a hot side heat sink 30' with a fan to remove the heat from the hot side heat sink 30'.

A circulation pump 22, which can be a gear pump, is preferably provided to pump the cooling liquid around circuit 16. It will be appreciated that as the cooling liquid flows through the loops in the pipes in the cold side heat exchangers, it is gradually cooled to a lower and lower temperature. Then, when it passes through the heat sink on the CPU, it is capable of absorbing a large quantity of heat from a small point, due to the constant flow of cold cooling liquid. A temperature sensor 26 is preferably coupled to heat sink 20 of CPU 12, so as to monitor the temperature of the CPU at all times. Preferably, a portion of cooling liquid circuit 16, such as that indicated at 28 between connectors X and Y, is formed of insulated Tygon or other flexible tubing, for flexible connection between the cooling system, which may be located outside the computer enclosure, and the CPU inside its enclosure.

Figure 3:
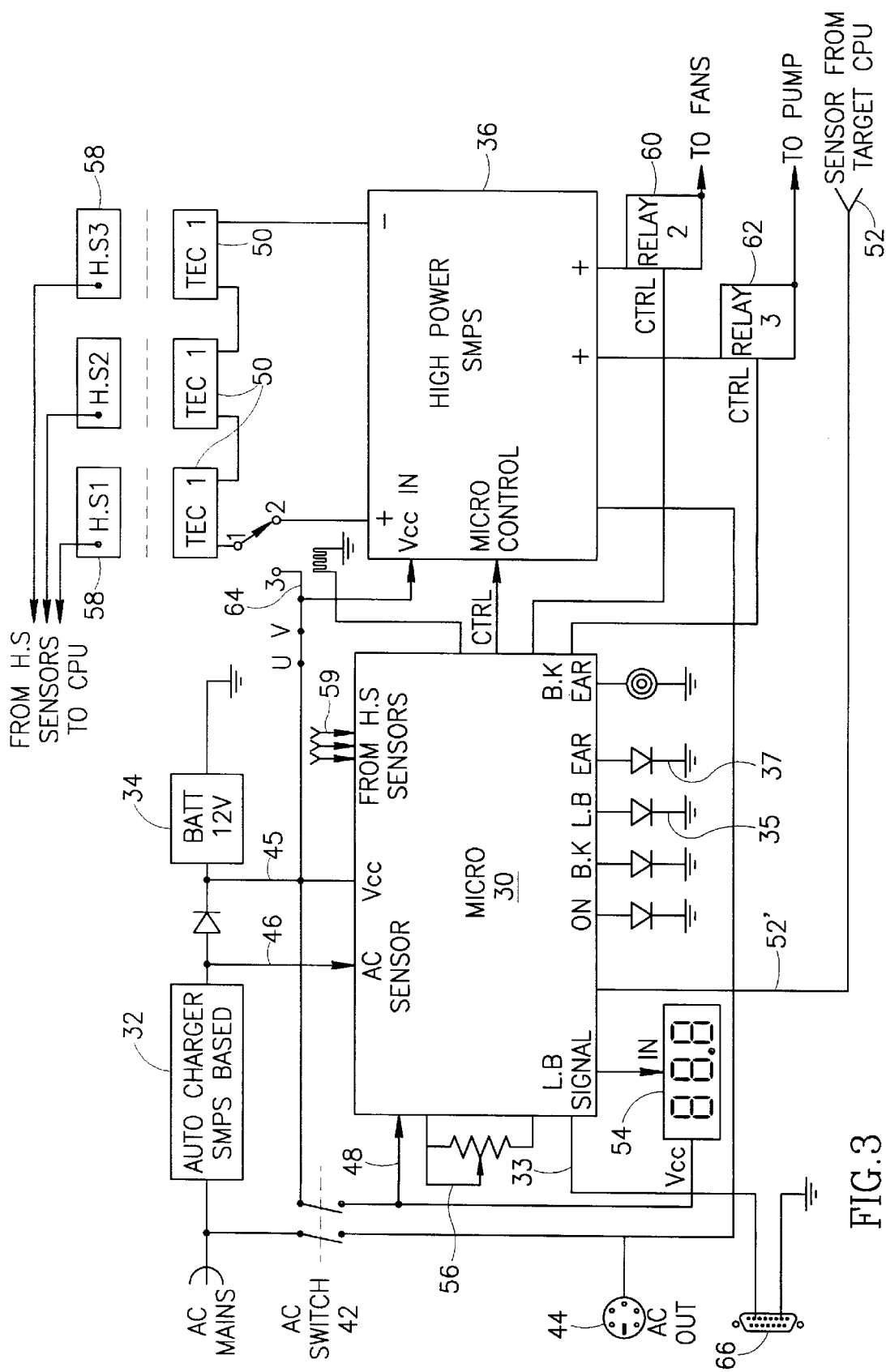
FIG. 3 is a schematic block diagram illustration of the electrical connections between the subsystems of an active cooling system according to one embodiment of the present invention.

Referring now to FIG. 3, there is shown a schematic block diagram illustration of the electrical connections between the subsystems of an active cooling system according to one embodiment of the present invention. The block diagram consists of five main sections: a microprocessor 30, a charger 32, a battery 34, a high power source 36, preferably a Switch Mode Power Supply (SMPS), and TEC units 50.

The AC mains is fed at 40 to the charger 32, and the charger lowers and rectifies the voltage (wide input range 85–250V). The lower voltage/current is fed to the battery 34 (rechargeable) for charging. It is a particular feature of the invention that the microprocessor accepts voltage via the charger 32 or the battery 34, so it is working all the time (even if the mains power is out), drawing a very low current while monitoring system activity, even when no mains power exists, such as in the event of a power outage.

When the battery is fully charged, the charging stops. The line power (mains) is fed to the high power SMPS 36 via an AC power switch 42. SMPS 36 is preferably a switch mode type SMPS, a high frequency ferrite or low profile planar transformer, similar to those manufactured by Payton Planar Magnetics Ltd., Israel, for high frequency switching, so only a small space is needed and high efficiency of power conversion is achieved. Power switch 42 is a DPDT dual switch coupled mechanically, but electrically isolated, and serves to turn on the computer, via an AC output 44 to the PC, only after the cooling system has been switched on. This safety feature prevents operation of the CPU when the cooling system is not operating. For example, the PC power cord can be connected directly to the SMPS for auxiliary output, so that the PC is energized only after turning on the cooling unit.

The mains power is also fed to the microprocessor 30 at $V_{cc}$ 45, and turns on the PC by supplying AC power via output 44 and jumper connector/cable to the PC AC inlet.

When the power switch 42 is switched on, the microprocessor 30 checks if AC power exists. If AC exists, the microprocessor 30 senses from the 'After Switch' 48, which is now high, that the SMPS must be activated. (The signal to "after switch" 48 comes from the battery source as, when the switch is closed, the battery is then connected to the input 48 of microprocessor 30.) Accordingly, microprocessor 30 sends a control signal from the control output (CTRL) to the SMPS 36, which then starts to work and delivers high power, low DC to the various Thermo-Electric Coolers (TECs) 50 connected to it, here shown as three. At first, the microprocessor 30 activates the TEC components 50 at highest power, so as to cool the CPU to a pre-set target temperature, and then sets and controls the temperature, as described below.

Each TEC is attached to an aluminum heat exchanger (cold side heat sink, shown in FIG. 1), which carries cooling liquid cooled by the TEC to the target CPU (or other semiconductor). The temperature of the target CPU is measured by a target CPU temperature sensor 52, located on the CPU heat sink, which is remote from the cooling unit but attached to it by flexible Tygon tubing. The sensor output is connected to the microprocessor 30 in the cooling unit, here shown in PC cover, at a temperature sensor input 52'.

Preferably, the microprocessor produces a signal to a digital display 54 to display the current temperature of the target. Similarly, the microprocessor 30 monitors the temperatures of the various cold side heat sinks of the TEC components 50 via heat sink temperature sensors 58. The output of sensors 58 is input to the microprocessor at a heat sink temperature input 59. These sensors permit the microprocessor to monitor and control the temperature in the TEC components' heat sinks, as well as to determine when one of the TEC components ceases to function in the proper fashion, requiring shut down of the PC.

The microprocessor keeps the target CPU at a preset level set by T1 56, i.e. when the temperature of the target increases, the microprocessor sends a control (CTRL) signal to the SMPS to increase the power of heat pumped by the TECs, and when the temperature of the target CPU decreases, the microprocessor sends a signal to the SMPS to decrease the power of heat pumped by the TECs. One preferred SMPS active part is catalog number TOP249Y marketed by Power Integration Inc., of San Jose, Calif., USA, which is capable of 250 Watts. It will be appreciated that, for more power, additional SMPS units can be added to the cooling system, and connected to more TECs.

The microprocessor also sends a signal to two relays, RLY2 60 coupled to fans in the computer enclosure (not shown) and RLY3 62 coupled to a circulation pump (not shown), to operate the pump and fans coupled to the TEC heat sinks. The control of Relay 2 and Relay 3 allows the microprocessor to stop/start the fans and/or pump according to different customer needs.

It will be appreciated that instead of being connected in series, as described above, the TEC components can be connected in parallel. In this case, the SMPS output is connected to three elements in parallel. However, since the current consumption would be higher and voltage lower than in the series arrangement, coupling in series is preferred, as it is more efficient.

It is a particular feature of the invention that the CPU is protected from a sudden temperature change, so as to prevent condensation and thermal shock (fast change in temperature to target CPU due to loss of power of the TEC from the SMPS), in case the mains power fails, for any reason. In case the mains power fails, the microprocessor 30 senses that the signal from AC sensor 46 is zero. It will be appreciated that, even if there is a power failure, the microprocessor and the TECs continue to get power to operate from the batteries, so there is control at all times, even though the AC power switch 42 is on (i.e., switch AC 48 is still pressed). The TECs continue working with reduced power (around 50%), so in this way the change in temperature (rise) is slow, preventing thermal shock and condensation, as the target CPU is not generating heat. In this case, a battery of 12 Volts, 2 AmpereHour, can be used, for example.

In order to prevent thermal shock and condensation, the microprocessor activates a relay RLY1 64. Activation of RLY1 64 changes its position from 1–2, coupling the TEC components 50 to the high power SMPS 36, to 1–3, as seen in FIG. 3, coupling the TEC components 50 to battery 34, so the TEC takes DC power directly from the back-up battery. When the battery becomes low, a signal is sent from microprocessor 30 over a low battery signal output 33 via a connector 66 to an RS232 (or USB, via the USB connection) signaling to the software in the PC that the PC must shut down, causing the software to start the shut-down routine (using the same principle as UPS software). At the same time, a low battery (L.B.) indicator 35 lights up, to indicate to a user that the battery is low.

It is a particular feature of the present invention that the battery voltage is low, compared to the SMPS, so the temperature is elevated to a mid-range very slowly, and then continues to rise as the battery is discharged. This particular feature enables the slow change of temperature from low to ambient, preventing thermal shock to the CPU and TECs, themselves. (The TEC life is shortened by thermal shock.) A low power battery is sufficient because, when there is a power failure, the target CPU does not generate heat.

The number of TEC units can range from one to more than three, for different heat pump/temperature requirements. The temperature from the cold side of each of the TEC units is measured and fed to the microprocessor for error finding. If the temperature readings are not equal, this indicates that one of the TEC units is not operating properly, i.e., has ceased to function according to pre-defined parameters. In this case, the computer will be shut down, and an indication of an error in the cooling unit will be provided. For example, if the power is on and the switch is on and there is a sudden change in TEC 1, say an increase of 7 degrees, then the Error LED 35 lights up, and the system is shut down via a signal sent over low battery signal output 33.

For the invention to be a commercial and technological success, the form factor is very important. According to a preferred embodiment of the invention, the active cooling system is mounted in the cover of the enclosure in which the CPU, or other heat sensitive element, to be cooled is mounted. It is particular feature of this embodiment that the entire cooling system, except the heat sink on the CPU, can be located in the enclosure cover. In this way the cooling system can be attached to any existing standard PC, with very little adjustment to the cover only, without changing the PC enclosure. In other words, since almost the entire cooling system of the present invention can be enclosed in a computer cover box, it can be attached to any computer by adapting the cover size, only, without any change required to the remainder of the PC enclosure. This is particularly attractive for fast and easy installation on any PC.

Figure 4:
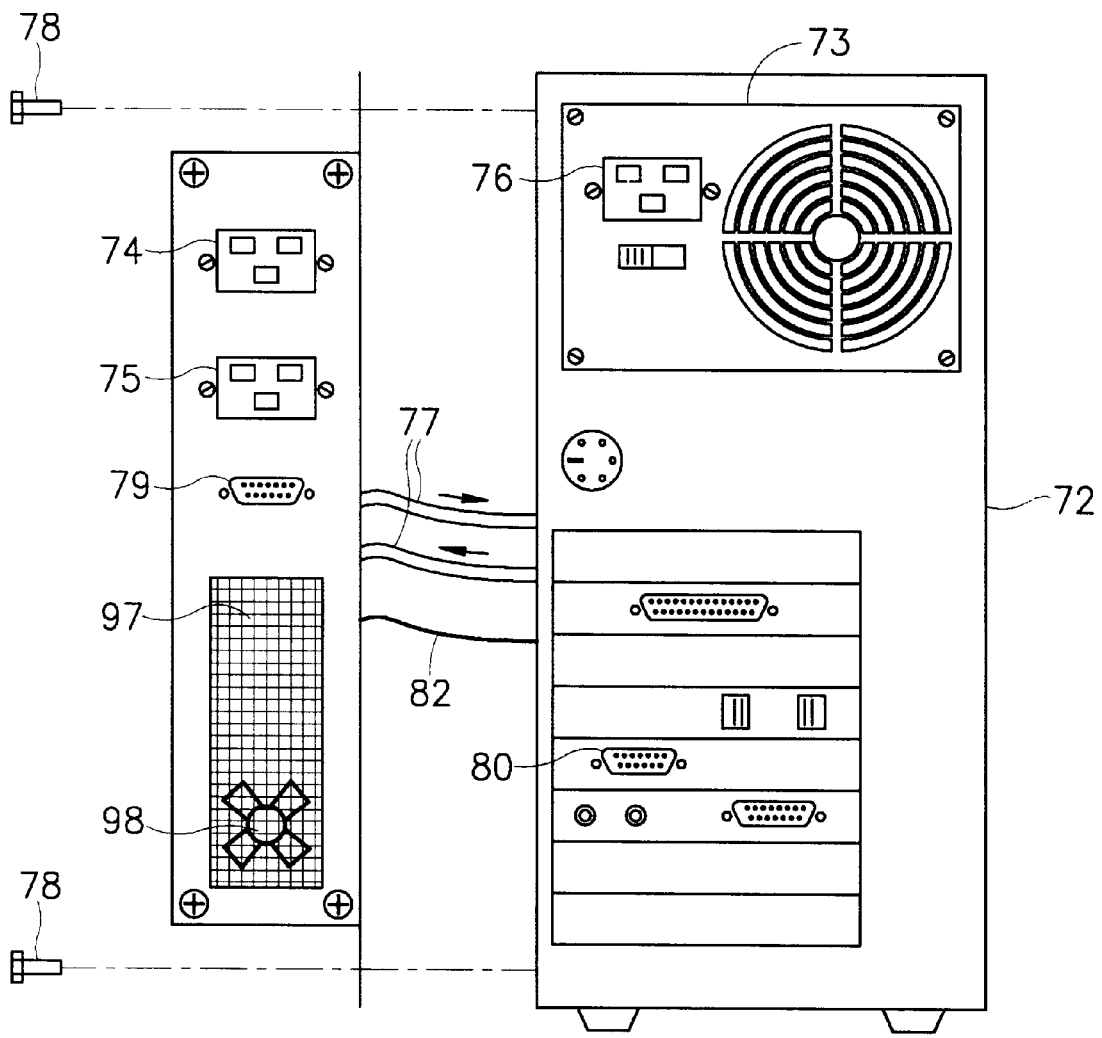
FIG. 4 is a schematic rear view illustration of an active cooling system and the rear of a PC, according to the present invention as mounted in a computer enclosure cover.
Figure 5:
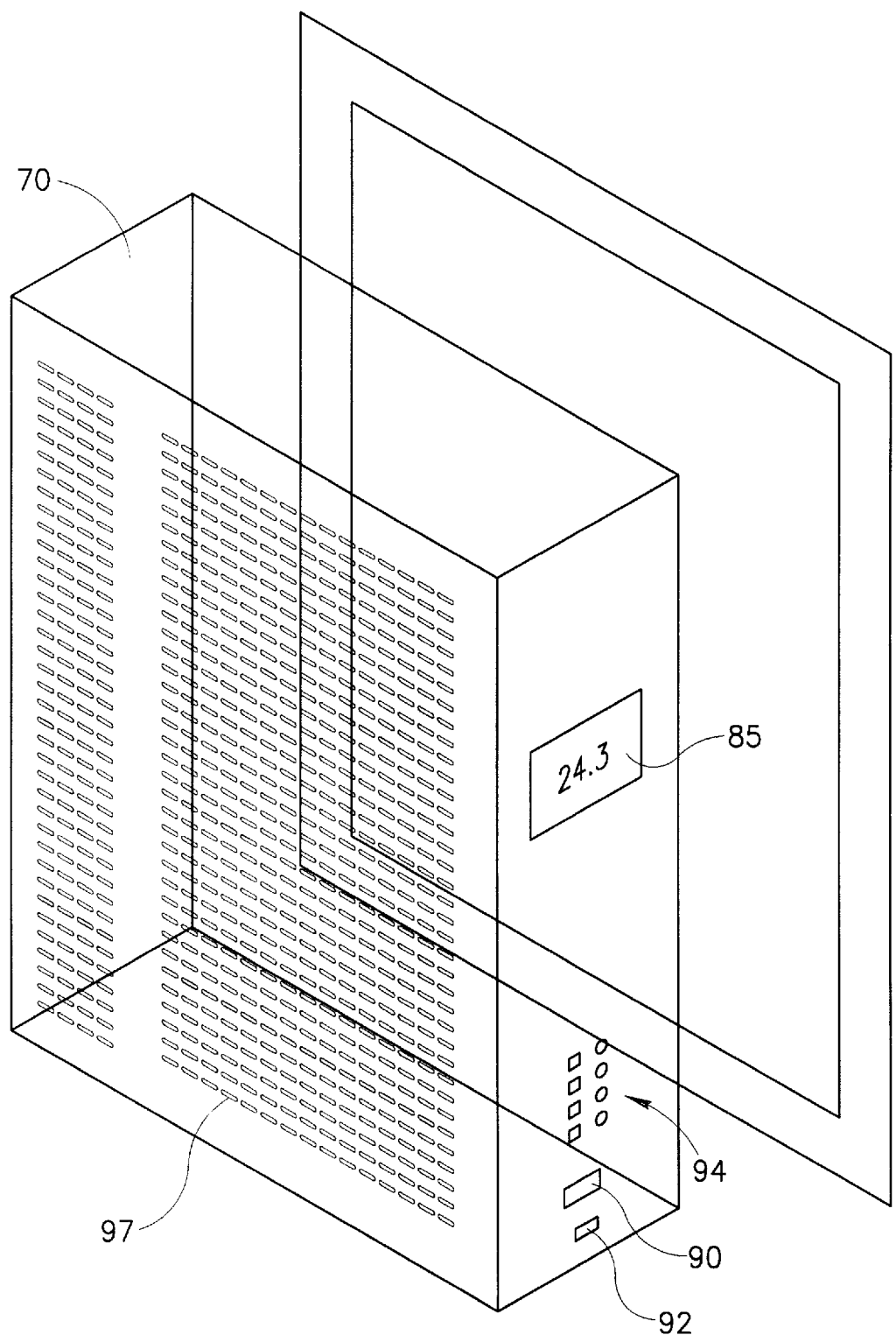
FIG. 5 is a schematic perspective front view of the active cooling system of FIG. 4.

Referring now to FIGS. 4 and 5, there are shown respective schematic rear and perspective front views of an active cooling system according to the present invention as mounted in the cover 70 of a computer enclosure 72. A power cord from the mains (or UPS outlet) electricity is fed to socket 74 on the cooling unit, and a jumper AC power cord connected from cooling unit outlet 75 to the PC socket 76. In this way, only after switching on the cooling unit, is the PC energized, as per the description in the block diagram. In addition, when the PC is switched off, the cooling fans continue to operate for a few minutes to cool the enclosure.

In order to achieve a 'planar look' (a low profile of the cooling unit), it is preferable to use planar transformer technology for the power supply (high power source in FIG. 1), such as a planar SMPS with high efficiency. One example of a suitable planar SMPS is that made by Payton Planar Magnetics Ltd., Rishon LeZion, Israel.

The cooling unit/cover 70 is attached, as by screws 78, to the PC/computer 72. Tygon tubing, or other flexible tubing 77, preferably including insulation, couples the CPU (not shown) in the enclosure to the cooling system in the cover. The Tygon tube delivers the cooled cooling liquid to the PC CPU and away in circulation. A wire 82 couples the temperature sensor on the target CPU to the microprocessor in the cooling unit. The target temperature can be displayed on a display on the front of the enclosure, such as display 85 in FIG. 5. An additional communication line is preferably connected from a cover connector 79, for output to an RS232 or USB, to an enclosure connector 80 in FIG. 5, such as for sending a low battery signal and for automatic shutdown of the PC in case the temperature of the CPU rises above a pre-determined threshold or when an error indication is received, as described above.

The front panel of the cooling system also includes a power switch 90, and preferably includes a buzzer hole 92 for inserting an alarm buzzer, in order to provide an audible indication of system status. The front panel may also include, for example, a number of LED indicators 94, here shown as four, for example to indicate AC power in (i.e., the cooling system is on and functioning), low battery, back-up power operation, and error (i.e., a difference in the various TEC temperatures). According to a preferred embodiment, the AC in indicator, which indicates when the thermoelectric unit is operating, is a blue LED, to psychologically indicate cold. This LED normally is on when the system is on. It is possible to utilize a flashing LED to indicate other operational parameters. A plurality of ventilation slots 97 are provided on the outward facing side and rear panel of the cooling system, to permit the outflow of heated air blown out by the cooling system fan 98 (FIG. 5).

Alternatively, the cooling system can be mounted in a separate enclosure coupled on top of, beneath, or at the side of the PC enclosure to be cooled. The cooling system could be connected by tygon units to the CPU, for example, through a bracket on the back of the PC enclosure. In fact, if a manufacturer wishes to redesign the entire enclosure for future generations of computers, it is particularly efficient for the cooling system to be located entirely within the enclosure.

Figure 6:
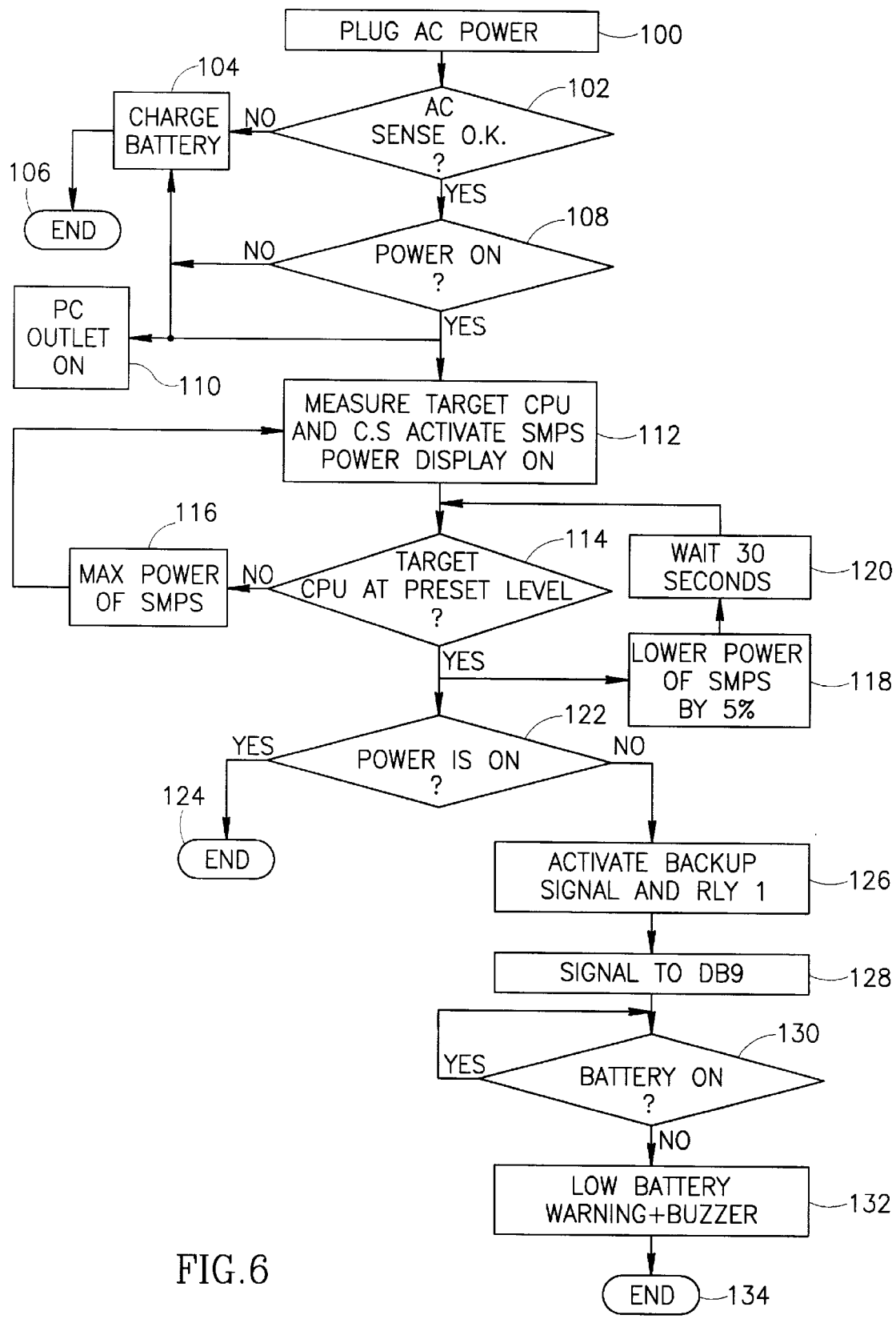
FIG. 6 is a flow chart of the cooling unit's microprocessor operations according to one embodiment of the present invention.

Operation of the present invention is as follows, with reference to FIG. 6, a flow chart of the cooling unit's microprocessor major operations. When the cooling system is plugged into the AC power source (block 100), the microprocessor checks if the AC sensor indicates power on (block 102). If not, the battery is charged (block 104), and the program ends (block 106). If the AC sensor indicates (block 102) there is no power from the AC source (i.e., a power failure), the microprocessor checks if the power switch is switched on (block 108).

If the power switch is on (block 108), then the microprocessor switches the computer outlet on (block 110), while continuing to charge the battery (block 104). At the same time, the microprocessor measures the temperature (block 112) of the target CPU and cold side heat sinks (reference 58 in FIG. 3). It also activates the SMPS (internal) power supply of the cooling system, and turns the temperature display on. The microprocessor now compares (block 114) the measured temperature with a pre-set desired target CPU temperature. If the target CPU is not at the pre-set level, the microprocessor activates the SMPS (block 116) at maximum power, to provide rapid cooling. This loop continues until the CPU reaches the pre-set level.

When the CPU reaches the pre-set level (block 114), the microprocessor reduces (block 118) the power of the SMPS by a predetermined percentage, here illustrated as 5%. The microprocessor waits (block 120) a period of time, say 30 seconds, and checks again whether the target CPU is at the pre-set level (block 114). In addition, once the CPU is at the target level, the microprocessor confirms that the power switch is still on (block 122). If so, that is the end of that program (block 124), i.e., the temperature is now set to the pre-set level, and the system is working normally.

If, for any reason, there is no power (block 122 in FIG. 6), the backup program is activated, to slowly increase the temperature of the CPU, while closing down the PC. Thus, the backup signal in microprocessor 30 is activated, which activates Relay 1 (block 126). Activating Relay 1 (64 in FIG. 1) means that TECs 50 in FIG. 1 are now powered by the battery 34, rather than by SMPS 36, which is no longer receiving AC mains power. A signal is also sent to DB9 connector or the USB in the back of the PC (block 128), beginning the PC shut down procedure.

The microprocessor now ensures that the battery is still providing backup power (block 130). If so, it continues to check periodically that the battery is providing power. Once the battery is close to the end of discharge, the low battery warning light is illuminated (block 132) and, possibly, a buzzer or other audio signal is activated, ending this routine (block 134).

Similarly, two parallel pumps, or alternate flow means, are provided for redundancy. The microprocessor periodically checks the pump, or the pump provides signals to the microprocessor, indicating the current consumption therethrough. If the microprocessor detects an abnormality in the pump flow, it switches the system to the second (parallel) pump.

It is a particular feature of the present invention that the thermoelectric component is powered by an independent power supply, i.e., mains or batteries, and not by the power supply of the PC. This permits the use of a relatively high-power cooling element, a thermoelectric cooler, in order to achieve a high power of heat pumping and/or to reduce the temperature of a CPU substantially, which is not possible in any conventional cooling system. This reduction in temperature permits greatly increased processing speeds, known as thermal acceleration of the CPU (CMOS devices).

It will be appreciated that the invention is not limited to what has been described hereinabove merely by way of example. Rather, the invention is limited solely by the claims which follow.

What is claimed is:

1. A cooling system for a heat sensitive element in an enclosure, the system comprising:

a high power active cooling unit having
at least one Thermo Electric Cooler (TEC) component having a cooling liquid circuit passing through a cold side heat sink therein,
the cooling liquid circuit being coupled to a heat sink coupled to the heat sensitive element and having a cooling liquid circuit therethrough;
a dedicated power supply;
a controller for controlling said TEC components and said cooling liquid pump; and
a backup battery selectively coupled to said TEC component; and a charger coupled to said battery and coupled to the microprocessor.

2. A cooling system for a heat sensitive element in an enclosure, the system comprising:
a high power active cooling unit having
at least one Thermo Electric Cooler (TEC) component having a cooling liquid circuit passing through a cold side heat sink therein,
the cooling liquid circuit being coupled to a heat sink coupled to the heat sensitive element and having a cooling liquid circuit therethrough;
a dedicated power supply; and
a controller for controlling said TEC components and said cooling liquid pump, wherein said controller is a microprocessor.

3. A cooling system for a heat sensitive element in an enclosure, the system comprising:
a high power active cooling unit having
at least one Thermo Electric Cooler (TEC) component having a cooling liquid circuit passing through a cold side heat sink therein,
the cooling liquid circuit being coupled to a heat sink coupled to the heat sensitive element and having a cooling liquid circuit therethrough;
a dedicated power supply;
a controller for controlling said TEC components and said cooling liquid pump; and further comprising a small power TEC, powered by said dedicated power supply, with a small cold side heat sink attached directly to said heat sink on the heat sensitive element, to provide additional cooling.

4. A cooling system for a CPU in an enclosure, the system comprising:
a high power active cooling unit having
at least one Thermo Electric Cooler (TEC) component having a cooling liquid circuit passing through a cold side heat sink therein,
the cooling liquid circuit being coupled to a heat sink coupled to the CPU and having a cooling liquid circuit therethrough;
a dedicated power supply;
a controller for controlling said TEC components and said cooling liquid pump; and
a power connection from said dedicated power supply to said CPU, whereby said CPU is energized only after turning on the cooling system.

5. The cooling system according to any of claims 1, 2, 3, or 4, wherein said heat sink coupled to the heat sensitive element, said TEC components and other elements of the cooling system are all located in the enclosure.

6. The cooling system according to any of claim 1, 2, 3, or 4, wherein said cooling liquid circuit is a factory set closed loop.

7. A method of cooling a heat sensitive element mounted in an enclosure, the method comprising:
coupling to the enclosure a high power active cooling unit, energized by a dedicated power supply, and having at least one Thermo Electric Cooler (TEC) component, the TEC component having a cooling liquid circuit passing through a cold side heat sink therein;
coupling said cooling liquid circuit to a cooling liquid circuit in a heat sink coupled to the heat sensitive element; and
pumping cooling liquid through said cooling liquid circuit, and coupling a microprocessor control unit to said TEC components, said heat sensitive element heat sink, and said cooling liquid circuit, to provide automatic control of temperature of the heat sensitive element and of a cooling liquid pump in said cooling liquid circuit, so as to reduce thermal shock and condensation.

8. A method of cooling a heat sensitive element mounted in an enclosure, the method comprising:
coupling to the enclosure a high power active cooling unit, energized by a dedicated power supply, and having at least one Thermo Electric Cooler (TEC) component, the TEC component having a cooling liquid circuit passing through a cold side heat sink therein;
coupling said cooling liquid circuit to a cooling liquid circuit in a heat sink coupled to the heat sensitive element; and
pumping cooling liquid through said cooling liquid circuit, whereby in case of mains power failure, energizing the cooling system by a back up battery; and
preventing thermal shock and condensation by slowly increasing the temperature of the heat sensitive element to about a temperature inside the enclosure.

9. The method according to claim 8, wherein said heat sensitive element includes a computer CPU, and further comprising:
initiating a shut down routine during operation of said back up battery, so as to shutdown the computer.

10. The method according to claim 8, wherein said heat sensitive element is a computer CPU, and further comprising:
providing an indication of a system error condition; and
initiating a shut down routine when said indication of system error condition is received, so as to shutdown the computer.

11. A method of cooling a heat sensitive element mounted in an enclosure, the method comprising:
coupling to the enclosure a high power active cooling unit, energized by a dedicated power supply, and having at least one Thermo Electric Cooler (TEC) component, the TEC component having a cooling liquid circuit passing through a cold side heat sink therein;
coupling said cooling liquid circuit to a cooling liquid circuit in a heat sink coupled to the heat sensitive element; and
pumping cooling liquid through said cooling liquid circuit, wherein said heat sensitive element is a computer CPU, and further comprising:
activating said high power active cooling unit; and
energizing said computer from an auxiliary power switch of the cooling unit, after said step of activating.

12. The method according to claim 7, wherein said microprocessor monitors and controls the temperature in the TEC components' heat sinks, and determines if one of said TEC components ceases to function according to predefined parameters.

13. The method according to any of claims 7, 8, or 11, further comprising illuminating a blue color LED when the cooling system is operating.

14. The method according to any of claims 7, 8, or 11, further comprising mounting the cooling system in an enclosure cover attached to the enclosure.

15. The cooling system according to any of claims 1, 2, or 3, wherein said heat sensitive element is computer CPU.

16. The cooling system according to any of claims 1, 2, 3, or 4, wherein said it least one TEC component includes a plurality of TEC components, and said cooling liquid circuit includes:

a single cooling liquid circuit passing through all the TEC components; and a cooling liquid pump.

17. The cooling system according to any of claims 1, 2, 3, or 4, wherein said dedicated power supply includes a high power SMPS (Switch Mode Power Supply).

18. The cooling system according to any of claims 1, 2, 3, or 4, wherein said high power SMPS is a low-profile, high efficiency planar SMPS.

19. The cooling system according to any of claims 1, 2, 3, or 4, wherein said heat sink coupled to the heat sensitive element is located in the enclosure, and said TEC components and other elements of the cooling system are enclosed in an enclosure cover, which is attachable to the enclosure.

20. The cooling system according to any of claims 1, 2, 3, or 4, wherein said heat sink coupled to the heat sensitive element includes a hot side heat sink formed of a material selected from aluminum, copper, or a combination of aluminum and copper.

21. The cooling system according to any of claims 1, 2, 3, or 4, wherein the cooling liquid circuit in said heat sink coupled to said heat sensitive element includes many cooling liquid passages, dispersed throughout a surface area of said heat sink, that combine into one inlet and one outlet, for the passage of cooled cooling liquid therethrough to remove heat from the heat sensitive element.

22. The cooling system according to any of claims 1, 2, 3, or 4, further comprising a blue color LED which is illuminated when the system is operating so as to indicate operation of the cooling system.

23. The cooling system according to any of claims 1, 2, or 3 wherein said heat sensitive element being a CPU and further comprising an automatic shut down system for turning off said CPU.

24. The method according to any of claims 7, 8, or 11, said step of coupling said cooling liquid circuit includes:

forming a plurality of cooling liquid passages in a surface of said heat sink coupled to said heat sensitive element; and coupling said cooling liquid circuit to said cooling liquid passages so as to pass cooled cooling liquid from said cold side heat sink through said heat sink cooling liquid passages.

25. The method according to any of claims 7, 8, or 11, wherein said step of forming includes forming many cooling liquid passages, dispersed throughout a surface area of said heat sink coupled to the heat sensitive element, that combine into one inlet and one outlet, so cooled cooling liquid passes therethrough and takes heat away from the heat sensitive element.

* * * * *